United States Patent [19]

Cohen et al.

[11] 4,456,953
[45] Jun. 26, 1984

[54] APPARATUS FOR AND METHOD OF ADDRESSING DATA ELEMENTS IN A TABLE HAVING SEVERAL ENTRIES

[75] Inventors: Violette Cohen, Paris; Philippe L. P. Levieux, Le Chesnay, both of France

[73] Assignee: Compagnie Internationale pour l'Informatique CII Honeywell Bull (Societe Anonyme), Paris, France

[21] Appl. No.: 219,387

[22] Filed: Dec. 22, 1980

[30] Foreign Application Priority Data

Dec. 20, 1979 [FR] France ................................. 79 31287

[51] Int. Cl.³ .............................................. G06F 9/36
[52] U.S. Cl. ................................................ 364/200
[58] Field of Search ....... 364/200 MS FILE, 900 MS FILE

[56] References Cited

U.S. PATENT DOCUMENTS

| | | | |
|---|---|---|---|
| 4,128,875 | 12/1978 | Thurber et al. | 364/200 |
| 4,155,119 | 5/1979 | De Ward et al. | 364/200 |
| 4,173,783 | 11/1979 | Couleur et al. | 364/200 |
| 4,188,662 | 2/1980 | Ishibashi | 364/200 |
| 4,188,664 | 2/1980 | De Shon | 364/200 |
| 4,218,743 | 8/1980 | Hoffman et al. | 364/200 |
| 4,279,014 | 7/1981 | Cassonnet et al. | 364/200 |
| 4,285,040 | 8/1981 | Carlson et al. | 364/200 |
| 4,296,468 | 10/1981 | Bandoh et al. | 364/200 |
| 4,318,175 | 3/1982 | Hawley | 364/200 |
| 4,326,248 | 4/1982 | Hinai et al. | 364/200 |

*Primary Examiner*—Joseph F. Ruggiero
*Assistant Examiner*—Gary V. Harkcom
*Attorney, Agent, or Firm*—Lowe, King, Price & Becker

[57] ABSTRACT

A data byte element E located at position d in entry i of memory section $M_a$ having reference entry TR is addressed. Memory section $M_a$ is one section of a table in a data processory memory, such that each of the entries in section $M_a$ has a predetermined number (t) of elements E. Signals having values related to the values of i, t and TR of several memory sections are stored in a storage device and read out when the storage device is addressed. A signal related to the value of d is also derived as a result of read-out from the storage device. The signals having values related to the values of i, t, TR and d are combined to derive an addressing signal for element E in memory section $M_a$ of the table of the data processing memory. An address circuit for the data processing memory responds to the addressing signal to addressing element E in memory section $M_a$.

21 Claims, 1 Drawing Figure

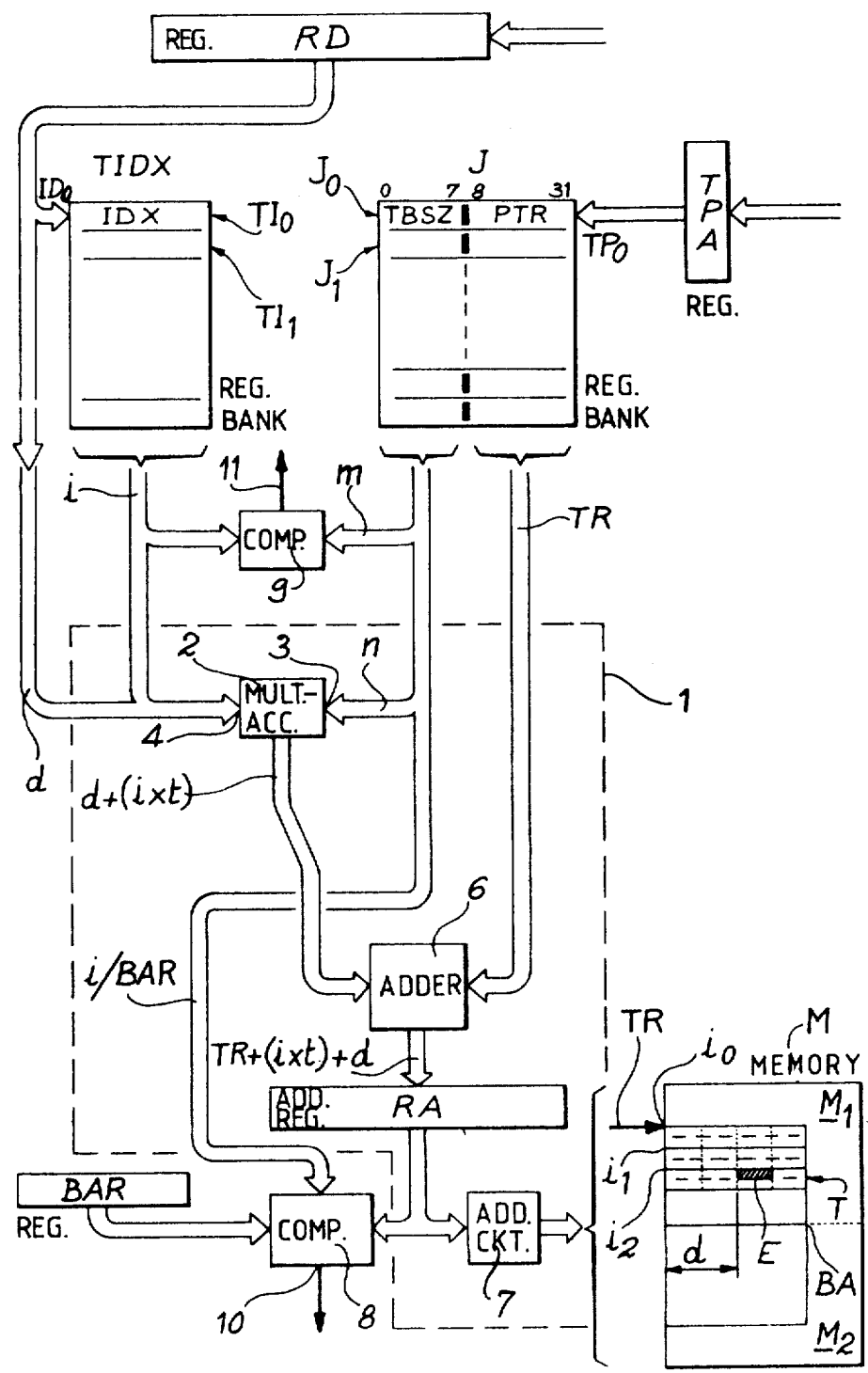

4,456,953

APPARATUS FOR AND METHOD OF ADDRESSING DATA ELEMENTS IN A TABLE HAVING SEVERAL ENTRIES

TECHNICAL FIELD

The present invention relates generally to an apparatus for and method of addressing data elements in a memory table of a data processor and, more particularly, to such an addressing apparatus and method that computes an entry address in response to signals indicative of a table reference address, a rank in the table relative to the reference address, the number of bytes of an entry containing the element sought to be addressed, and the position of the element sought to be addressed with respect to the beginning of the rank of the entry containing the element.

BACKGROUND ART

In prior art data processing memory tables, a correlation is established between data sought from the memory and input data which makes it possible to locate the sought data. In general, in order to obtain the data contained in a memory table, it is necessary to provide a "locator" which successively indicates the addresses of entries opposite which data are stored. In the present devices, access to complex data contained in a memory table does not begin until substantial logical or micrological processing of signals indicative of the table location has been completed. To provide accessing to information stored in a table in most presently available systems, it is necessary for an operator to specify many parameters in an access instruction signal supplied to a data element contained in a table. The prior art devices, consequently, have the resulting disadvantage of requiring considerable computer time, which adversely affects the performance of data processing units using the prior art table accessing devices.

It is, accordingly, an object of the present invention to provide a new and improved device for and method of addressing data elements in a table having several entries recorded in a memory.

Another object of the invention is to provide a new and improved table addressing device and method which do not require substantial logical or micrological processing.

It is a further object of the present invention to provide a new and improved table accessing device that is of higher speed than the prior art devices.

A further object of the present invention is to provide a new and improved table accessing device that uses relatively simple structure.

Still another object of the present invention is to provide a new and improved apparatus for and method of accessing relatively complex data elements contained in a memory table having several cells, referred to as entries.

DISCLOSURE OF INVENTION

In accordance with the present invention, an element E stored in a section of a table of a data processor memory M is addressed in response to signals indicative of a reference entry (TR) of the table, a rank (i) of a memory entry containing element E, the number (t) of data bytes in each entry of the section of the table where E is located, and the position (d) of element E with respect to the beginning of the entry (i) containing element E. The signals indicative of the values TR and t are stored in registers of a first register bank, in turn responsive to a signal stored in a buffer register indicative of a desired segment of the memory table to be addressed. Signals indicative of the rank (i) within a memory segment are stored in registers of a second register bank, in turn responsive to a microprogram word contained in a buffer register. The microprogram word contained in the buffer register includes, as one segment thereof, a bit segment indicative of the position d, and a second segment for addressing the second register bank.

To calculate the location of element E in memory M, an addressing calculator includes a digital multiplication circuit having a first input responsive to a signal derived from the first bank of registers and indicative of t. A second input of the multiplier is responsive to a signal indicative of the value of i, as derived from the second register bank, to derive a digital signal having a value commensurate with $i \times t$. The signal having a value indicative of $i \times t$ is accumulated with the segment of the microprogram word indicative of d, to derive a further digital signal having a value commensurate with $d + (i \times t)$. A digital summing circuit responsive to the output signal of the digital multiplier having a value commensurate with $d + (i \times t)$ is also responsive to a digital signal having a value commensurate with TR, as derived from the first bank of storage registers. The summing circuit responds to the two input signals thereof to derive a digital output signal having a value indicative of $TR + (i \times t) + d$. The output signal of the summing circuit is supplied to a register, which in turn supplies a digital signal to an addressing circuit for the memory.

In the preferred embodiment, the multiplier is a binary shift register which is loaded with a binary signal indicative of the value of i. After the binary signal having a value indicative of i is loaded into the shift register, the loaded signal in the shift register is shifted n places to the left, where $t = 2^n$. After the shifting operation has been performed, the shift register functions as an accumulator responsive to a digital signal having a value commensurate with d, whereby the output of the accumulator-shift register is a digital signal having a value commensurate with $d + (i \times t)$.

In accordance with a further feature, the calculating device for the address of element E includes a register for addresses of limits within memory sections of the table. Because each element which is to be addressed occupies a predetermined position in the memory with respect to a limit of the section where the element is stored, it is possible to determine if the calculated value is faulty or valid. To this end, a threshold comparator compares the contents of the calculated address having a value $TR + (i \times t) + d$ with a signal having a predetermined magnitude indicative of the address for the limit of the section where the element is located. In response to the calculated address exceeding the address for the limit of the memory section where element E is located, the comparator derives an indication of the calculated address being in error. The faulty indication prevents addressing of the memory by the addressing circuit.

According to an additional feature of the invention, a determination is made as to whether the index derived from the second register bank is greater than a maximum number commensurate with the number of entries in the table which contains element E. To this end, a second comparator has first and second inputs respectively responsive to signals from the first and second banks of registers and respectively indicative of the values of m and i, where m is the maximum number of entries in the table. In response to the second comparator deriving a signal indicative of i being greater than m, a fault signal is derived, to prevent the addressing circuit from supplying an address signal to the table.

According to a further feature of the invention, binary data relating to the relative position of the table in memory with respect to the limit of the memory section in which it is stored are stored in registers containing binary values representing the number of table entries.

The present invention is particularly applicable to addressing elements in tables contained in a central memory of a data processing unit.

The above and still further objects, features and advantages of the present invention will become apparent upon consideration of the following detailed description of one specific embodiment thereof, especially when taken in conjunction with the accompanying drawings.

BRIEF DESCRIPTION OF THE DRAWING

The sole FIGURE of the drawing is a block diagram of a preferred embodiment of the invention.

BEST MODE FOR CARRYING OUT THE INVENTION

The sole FIGURE is a schematic illustration of a device in accordance with a preferred embodiment of the invention for addressing data elements in table T of memory M, which is a typical memory in a main memory of a data processing unit. Table T stores binary bits which are organized into eight bit bytes, each of which is considered as an element; for the purposes of the FIGURE, it is assumed that it is desired to read the eight bits in a byte element E. The data bytes stored in table T can represent any type of data, although they contain microinstructions in a preferred embodiment. Table T occupies a predetermined position in memory M with respect to a limit position BA between sections $M_1$ and $M_2$ of memory M. Limit BA establishes a boundary of memory M between memory sections $M_1$ and $M_2$. In a typical example, memory section $M_1$ stores microinstructions, while memory section $M_2$ stores instructions. Table T of memory section $M_1$ includes several entries, three of which are illustrated as $i_0$, $i_1$, and $i_2$, each of which includes a predetermined number of eight bit byte elements. In the preferred embodiment, each of entries $i_0$, $i_1$, $i_2$ . . . contains eight data byte elements. Section $M_1$ of memory M contains data which can be read only in response to signals from micrologic elements of a data processor of which the memory is a part, while memory section $M_2$ contains signals respresenting data which can be read by both the logic and micrologic elements of a data processing system of which the memory is a part. The limit control established by boundary BA prevents the logic elements of the data processor from gaining access to data of memory section $M_1$, to which the logic device devices should not have access.

In the embodiment illustrated in the FIGURE, element E is assumed to be located in table T of memory section $M_1$ of memory M at a byte position having rank 3 in entry $i_2$; entry $i_2$ is the third entry in section M, since the first entry is $i_0$ and element E is the third element in the third entry. Thus, element E is an eight bit byte having rank 19 with respect to the beginning of reference entry TR of table T in memory section $M_1$ of memory M, since the first byte element located in the first entry of table T has rank 0. While element E is an eight bit byte of an octet in the preferred embodiment, it is to be understood that element E could denote an element having a different number of bits. Entries $i_0$, $i_1$, $i_2$ . . . in Table 1 are defined by the entry values such that $t=2^n$, where t is the number of bytes in a particular entry and n is an integer that is the same throughout table T.

In response to data contained in an input instruction or microinstruction supplied to the apparatus of FIG. 1, the device of the present invention is able to locate data element E in entry $i_2$ at a position or offset d with respect to the start of entry $i_2$. Position or offset d denotes the displacement in bytes with respect to the beginning of the particular entry, e.g., $i_2$. In the specific embodiment illustrated, element E is an eight bit byte in entry $i_2$ having eight bytes, whereby $n=3$ and $t=9$.

Locating element E in Table T is performed in response to signals stored in a storage means including buffer registers RD and TPA. Registers RD and TPA are respectively loaded with microprogram words originating from logic elements within the data processing system of which the invention is a part and with a microprogram word or data originating from a bus of the data processing system which uses the device of the invention, as illustrated in FIG. 1. The microprogram word or data loaded in register TPA is supplied as a multibit selection signal $TP_0$ to register bank J which includes a plurality of thirty-two bit registers $J_0, J_1$ . . . . Each of the Thirty-two bit registers in register bank J includes the reference or starting address TR of each of the sections $M_1, M_2$ . . . of table T. The values of t for memory sections $M_1, M_2$ . . . are stored in several of bit positions 0–7 of registers $J_0, J_1$ . . . ; other bits of bit positions 0–7 of registers $J_0, J_1$ . . . store binary signals indicative of the maximum number (M) of entries in sections $M_1, M_2$ . . . ; still other bits of bit positions 0–7 of registers $J_0, J_1$ . . . store binary signals indicative of the boundary entry i/BAR of sections $M_1, M_2$ . . . ; the bits in positions 0–7 of registers $J_0, J_1$ . . . are denoted as signals TBSZ. In contrast, signals PTR indicative of the reference positions TR of memory sections $M_1, M_2$ . . . are stored in bit positions 8–31 of register $J_0, J_1$ . . . . The signals TBSZ and PTR are loaded into the registers of register bank J when the device illustrated in the FIGURE is initially put into operation. The registers in register bank J are referred to as table location and value registers.

The microprogram word loaded into register RD is divided into two mult-bit segments. A first segment is commensurate with the value d from the start of entry i where the byte element sought to be read is located. The second segment of the word loaded into register RD is indicative of an address in register bank TIDX for a particular one of registers $TI_0, TI_1$ . . . . Registers $TI_0, TI_1$ . . . store signals having a value IDX commensurate with the values of indices i in memory sections $M_1, M_2$ . . . of table T. Thus, registers $TI_0, TI_1$ . . . of register bank TIDX are indexing registers which are loaded with signals IDX relating to the rank i of an entry containing the data element in table T which is to be addressed. The rank i is qualified as an index and enables the entry desired to be read out to be addressed by taking as the reference address or base address the reference entry TR which is located in response to signal PTR in the selected register in register bank J. Register J and TIDX thus are respectively defined as a table describer register and a register for indexing entry into table T. Thus, registers RD and TPA store all of the information necessary to access a particular element E in table T. Part of the information in registers RD and TPA is respectively applied to register banks TIDX and J, which in turn derive binary signals having values commensurate with i, n and TR.

The binary signals indicative of the values of TR, n, i and d, as derived from selected registers in register banks J and TIDX, as well as a segment of the word stored in register RD, are combined in addressing means 1 which determines the address of element E in table T with reference to reference entry TR. Addressing circuit 1 includes a digital multiplier circuit 2, having input terminals 3 and 4 respectively responsive to multi-bit signals indicative of n and i. As indicated supra, the multi-bit signals indicative of n are derived from bit positions 0-7 of a selected register in register bank J, while the multi-bit signal commensurate with i is derived from a selected register within register bank TIDX. In the preferred embodiment, multiplier 2 is a multi-stage shift register, the stages of which are loaded in parallel by the signal supplied to input terminals 4 and commensurate with the value i, as derived from the selected register of register bank TIDX. After the stages of the shift register in multiplier 2 have been so loaded, terminal 3 is supplied with a shift signal commensurate with the value of n, as derived from bits 0-7 of the selected register in bank J. In the described example, element E is located in entry $i_2$ of rank 2, whereby the three least significant stages of the register in multiplier 2 are loaded with the values 010. Because there are eight bytes in entry $i_2$, n=3, i.e., $t=2^n$, and $t=2^3$, and t therefore equals 8. Because n=3, the signal stored in the three least significant stages of the shift register in multiplier 2 is shifted three stages to the left, whereby the five least significant bit stages of the shift register in multiplier are loaded with binary signals in the form 10000. The address of the entry where element E is located is thus 16 with respect to reference entry TR. In a preferred embodiment, the shift register included in multiplier 2 is of a type described in U.S. Pat. No. 3,967,101.

After signals having values commensurate with i and n have been supplied to terminals 3 and 4 of multiplier 2, a signal commensurate with the value of d, as stored in the first segment of register RD, is supplied to terminal 4 of multiplier 2. The binary bits in the signal commensurate with the value of d are combined with the signals previously stored in the shift register, whereby the shift register functions as an accumulator register in response to the signal commensurate with d and the signal previously derived therein commensurate with i×t. Multiplier 2 thus derives a multi-bit binary output signal having a value commensurate width d+(i×t).

Addressing circuit 1 also includes digital summing circuit 6 having multi-bit inputs responsive to the output signals d+(i×t) from multiplier 2 and a signal having a value TR, as derived from bits 8-31 of the selected register in register bank J. Summing circuit 6 responds to the input signals thereof to derive a binary signal having an output signal commensurate with the sum TR+(i×t)+d. The binary signal derived from summing network 6 is supplied to address register RA, having a multi-bit output that is connected to input terminals of address control circuit 7 for memory M. Address control circuit 7 is thus supplied with a multi-bit binary signal having a value commensurate with: the address of reference entry TR of table T, the product i×t which provides the address of the entry which contains element E with respect to reference entry TR, and offset d which indicates the displacement of element E with respect to the start of the entry in question.

In the specific example, n=3, whereby t=8. It is to understood, however, that other values of n can be assumed. For example, if n=2, t=4, in which case the entry i containing element E has an address 4×2=8. In such a situation, multiplier 2 derives the product i×t=8 by supplying the two least significant stages of the shift register in the multiplier with the binary value 10, commensurate with i=2. Also, n=2, whereby there are two shifts to the left within the shift register of multiplier 2, whereby the four least significant stages of register 2 are loaded with binary bits 1000.

It is thus seen that multiplier circuit 2 is basically a logarithmic shifting circuit which shifts the binary expression having rank i by a number of bits equal to $\log_2 t^n = n \log_2 t$, which is equivalent to shifting the contents (i) of the shift register n bits to the left. Multiplication by $2^n$ in binary operation is equivalent to shifting to the left by n ranks the binary expression of the number which is multiplied by $2^n$. The result is that the signal TBSZ is sufficient to define the binary value of n, to enable the product i×t to be subsequently established by the shift register in multiplier 2. The shift register in multiplier 2 thus makes it possible to add the value d of the offset to the product i×t by a simple accumulation operation.

The apparatus of the FIGURE also includes a register BAR which contains addresses for the limits of different sections in memory M. In memory M, register BAR contains the address of the limit BA which divides memory M into sections $M_1$ and $M_2$, which as previously indicated are respectively reserved for storing data which are not responsive and are responsive to signals from logic circuitry within the data processor of which the apparatus of FIG. 1 is a part. Element E, which is addressed, occupies a predetermined position relative to limit BA of section $M_1$ where it is stored.

In the particular example illustrated in the FIGURE, element E is above limit BA since the element is in section $M_1$. The predetermined relative position of limit BA is located by binary data contained in certain of the bits in signal TPSZ in bit positions 0-7 of the selected register in register bank J; the limit value is indicated as a signal having a magnitude i/BAR. The signal derived from register RA and signal i/BAR indicate whether the indicated entry i containing element E is located above or below limit BA of memory section $M_1$. In fact, these data essentially indicate whether the address or rank of the entry i is higher or lower than the section limit address contained in section limit register BAR.

To determine if the calculated value for element E is within limit BA, the apparatus includes a threshold comparator 8 having a first multi-bit input responsive to the multi-bit output of address register RA and the multi-bit output of register BAR, commensurate with the value BA. Comparator 8 is also responsive to the signal from the selected register in register bank J indicative of the value i/BAR that relates to the relative position of element E in table T with respect to the limit BA of the memory section $M_1$ where the element E is stored. Comparator 8 derives a fault signal at output terminal 10 thereof in response to the difference between the actual address of element E, as derived from address register RA and address BAR of section limit BA. If the actual address output of register RA is greater than the section limit signal BAR, in register BA, the fault signal is derived from comparator 8.

Bit positions 0-7 of the register containing the maximum number of entries in table T are combined with the entry value i derived from the selected register in bank TIDX to determine if the indicated entry is faulty or valid. To this end, the register in register bank J where the value of m is stored is read out into comparator 9 after the value of n has been supplied to multiplier 2. Comparator 9 thus includes a first multibit input responsive to a signal commensurate with the value of m and a second multibit input responsive to the signal commensurate with the value of i. Comparator 9 responds to the signals supplied to the first and second multi-bit inputs thereof to derive a fault signal at output terminal 11 thereof in response to the value of i being greater than the value of m. The fault indicating signals at output terminals 10 and 11 of comparators 8 and 9, respectively, are supplied as disabling signals to address circuit 7, to prevent the address circuit from accessing an incorrectly computed value for element E in table T.

It is thus seen that the present invention provides for rapid addressing of data elements in table T, even though the table has many entries stored therein. The invention avoids substantial logical or micrological processing, thus promoting a substantial savings in time in gaining access to complex data elements contained in table T, in turn located in a central memory of a data processing unit.

While there has been described and illustrated one specific embodiment of the invention, it will be clear that variations in the details of the embodiment specifically illustrated and described may be made without departing from the true spirit and scope of the invention as defined in the appended claims.

We claim:

1. A device for addressing data bytes located in entries i in a selected one of plural tables, each having several entries, the bytes being stored in a memory, comprising locator storing means for storing signals representing locators denoting reference entries TR of the selected table and for storing signals having values related to values t for the number of bytes of data stored in each entry of the selected table, different tables having entries with different numbers of bytes so that there are plural values of t, means for storing signals representing the ranks held by entries i containing elements E which are to be addressed with respect to reference entries TR in the selected table, i and t being positive integers, means for addressing element E in response to the signals related to values of the reference entry TR, of the value t, of the rank i and of the value of the position d of element E with respect to the start of the entry containing element E in accordance with the algebraic combination of $TR+(i\times t)$, a microprogram word source including bits representing the value of position d, means for coupling at least a portion of the microprogram word as an address signal to the means for addressing element E so element E is addressed in accordance with the algebraic combination of $TR+(i\times t)+d$.

2. The device of claim 1 wherein the means for addressing element E comprises a multiplier circuit having inputs responsive to outputs of the means for storing the signals related to the values of t and d, a summing circuit having inputs responsive to output signals of the multiplier circuit and to output signals of the means for storing signals related to the value of reference entry TR of the selected table, and an address register responsive to the output signals of the summing circuit, and an address circuit for addressing the memory in response to an output signal of the address register.

3. The device of claim 2 wherein the means for storing signals indicative of the rank i and of the value t include binary register banks.

4. The device of claim 3 wherein the signal indicative of the value t for the entries of the selected table are in the form $t=2^n$, where n is a fixed positive integer for the selected table, the multiplier circuit being a shift register for storing a signal indicative of the value of i, the signal stored in the shift register being shifted in one direction n places in response to a signal indicative of the value of n as stored in the locator storing means.

5. The device of claim 4 further comprising a section register for storing signals indicative of limit addresses between sections of the memory, each element E which is to be addressed occupying within the memory a predetermined relative position with respect to a limit value BA of the section where it is stored, and a threshold comparator for comparing the signal stored in the address register with the signal stored in the section register, said comparator being responsive to signals from the locator storing means indicative of the relative position of element E in the selected table with respect to the limit BA of the memory section where element E is stored in the selected table, whereby the comparator derives a fault indicating signal in response to the magnitude represented by the signals in the address register being greater than the magnitude of the signal in the section register.

6. The device of claim 4 wherein registers in the locator storing means contain bits for binary values representing the value t of each entry and bits for binary values representing the maximum number of entries of the selected table, a threshold comparator responsive to output signals of the registers in the locator storing means and to an output signal of further registers in the locator storing means, the further registers containing the binary values representing the rank i, said comparator deriving a fault signal when the value of the rank i exceeds the maximum number of entries of the selected table.

7. The device of claim 5 wherein the binary signals representing the relative position of the selected table with respect to the limit of the memory section in which it is stored, are stored in the registers of the locator storing means containing the bits for binary values representing the value of the entries of the selected table.

8. Apparatus for addressing data byte elements E located at positions d in entries i of several memory sections M having reference entries TR, memory section $M_a$ being one section of a table in a data processor memory, the number (t) of data byte elements in different memory sections M being different, comprising storage means for signals having values related to the values of i, t and TR of the several memory sections, input means for addressing the storage means to derive the signals having values related to the values of i, t and TR for a particular memory section, the input means deriving a signal related to the value of d, means for combining the signals having values related to the values of i, t, TR and d in accordance with the algebraic relationship $TR+(i\times t)+d$ for deriving an addressing signal for elements E in memory sections M of the table of the data processing memory, and an address circuit for the data processing memory responsive to the addressing signal for addressing elements E in memory sections M of the data processing memory.

9. Apparatus according to claim 8 wherein the signal related to the value of t in the storage means is a first binary signal having a magnitude n in accordance with $t=2^n$ and the signal related to the value of i in the storage means is a second binary signal having a magnitude equal to i, combining means including a shift register, means for loading the shift register with the second binary signal, and means for shifting the loaded contents of the shift register in response to the value of the first binary signal.

10. Apparatus according to claim 9 wherein the input means for addressing and deriving a signal related to the value of d includes first and second microprogram word sources, the storage means including first and second addressable register banks, each register of the first register bank storing binary signals commensurate with the values of n and TR for different sections of the table, each register of the second register bank storing binary signals commensurate with the values of i for different sections of the table, means for addressing a selected register in the first memory bank in response to the first microprogram word source, and means for addressing a selected register in the second memory bank in response to the second microprogram word source.

11. Apparatus according to claim 10 wherein a portion of the second microprogram word source includes predetermined bits having values commensurate with the value of d, and means for supplying the bits in the portion of the second microprogram word source commensurate with the value of d to an accumulator so that value of d is accumulated with the shifted loaded contents of the shift register.

12. Apparatus according to claim 8 wherein the means for addressing and deriving a signal related to the value of d includes first and second microprogram word sources, the storage means including first and second addressable register banks, each register of the first register bank storing binary signals commensurate with the values of n and TR for different sections of the table, each register of the second register bank storing binary signals commensurate with the values of i for different sections of the table, means for addressing a selected register in the first memory bank in response to the first microprogram word source, and means for addressing a selected register in the second memory bank in response to the second microprogram word source.

13. Apparatus according to claim 8 wherein the means for addressing and deriving a signal related to the value of d includes first and second microprogram word sources, the storage means including first and second addressable register banks, each register of the first register bank storing binary signals commensurate with the values of n and TR for different sections of the table, each register of the second register bank storing binary signals commensurate with the values of i for different sections of the table, means for addressing a selected register in the first memory bank in response to the first microprogram word source, and means for addressing a selected register in the second memory bank in response to the second microprogram word source.

14. Apparatus according to claim 12 or 13 wherein a portion of the second microprogram word source includes predetermined bits having values commensurate with the value of d, and means for supplying the bits in the portion of the second microprogram word source commensurate with the value of d to an accumulator so the value of d is accumulated with the shifted loaded contents of the shift register.

15. Apparatus according to claim 8 wherein the means for addressing includes first and second microprogram word sources, the storage means including first and second addressable register banks, each register of the first register bank storing binary signals commensurate with the values of n and TR for different sections of the table, each register of the second register bank storing binary signals commensurate with the values of i for different sections of the table, means for addressing a selected register in the first memory bank in response to the first microprogram word source, and means for addressing a selected register in the second memory bank in response to the second microprogram word source.

16. Apparatus for addressing data byte elements E stored in tables TR of a memory, each of tables TR including a plurality of entries of index i, each of the entries including a plurality of ranks d, different ones of tables TR having entries having different numbers (t) of bytes, the memory being addressed by a first combination of bits with a value representing d, a second combination of bits representing an address for a first memory section and a third combination of bits representing an address for a second memory section, comprising a first memory section addressed by the second combination of bits, the first memory section storing a first sequence of first signals and responding to the second combination of bits to read out a first signal having values representing i, a second memory section addressed by the third combination of bits, the second memory section storing second and third sequences of second and third signals and responding to the third combination of bits to read out second and third signals respectively having values related to the values of t and TR, means responsive to the first, second and third signals and the first combination of bits for deriving an addressing signal having a value indicative of an addressed element in accordance with an algebraic combination of the values of TR, i, t and d so $E=TR+(i\times t)+d$, and means responsive to the addressing signal for addressing data byte elements E.

17. The apparatus of claim 16 wherein the values of t are in accordance with $t=2^n$, the second memory storing the second sequence as values of n, so the second signal has values of $n=\log_2 t$, the means for deriving the addressing signal including a shift register loaded by the first signal to store one of the first sequence of bits in accordance with the binary value of i, the shift register responding to the second signal to shift the loaded first sequence of bits by the value of n so that the shift register stores a bit sequence having a value equal to $i\times t$.

18. The apparatus of claim 16 wherein the values of t are in accordance with $t=2^n$, the second memory storing the second sequence as values of n, so the second signal has values of $n=\log_2 t$, the means for deriving the addressing signal including a shift register loaded by the first signal to store one of the first sequence of bits in accordance with the binary value of i, the shift register responding to the second signal to shift the loaded first sequence of bits by the value of n so that the shift register stores a bit sequence having a value equal to $i\times t$, the shift register being activated to function as an accumulator register and responsive to the first combination of bits representing d after it has stored the bit sequence having a value equal to $i\times t$ so that the shift register stores a bit sequence having a value equal to $i\times t+d$.

19. The apparatus of claim 16 wherein the values of t are in accordance with $t=2^n$, the second memory storing the second sequence as values of n so the second signal has values of $n = \log_2 t$, the means for deriving the addressing signal including means for logarithmically converting the values of $n = \log_2 t$ of the second signal into values of t.

20. A method of addressing data byte element E stored in one of tables TR of a memory, each of tables TR including a plurality of entries of index i, each of the entries including a plurality of ranks d, different ones of tables TR having entries having different numbers (t) of bytes, the memory including a first memory section storing a first sequence of first signals having values representing i, a second memory section storing second and third sequences of second and third signals respectively having values related to the values of t and TR, the method comprising: addressing the memory with: (a) a first combination of bits having a value representing d, (b) a second combination of bits representing an address for the first memory section, and (c) a third combination of bits representing an address for the second memory section; the first memory section responding to the second combination of bits to read out a first signal having a value representing i, the second memory section responding to the third combination of bits to read out second and third signals respectively having values related to the value of t and the value of TR, responding to the first, second and third signals and the first combination of bits to derive an addressing signal having a value indicative of an addressed element in accordance with an algebraic combination of the values of $TR(i \times t) + d$ and addressing data byte element E in response to the derived addressing signal.

21. The method of claim 20 wherein the values of t are in accordance with $t = 2^n$, the second memory storing the second sequence as values of n so the second signal has values of $n = \log_2 t$, the addressing signal being derived by logarithmically converting the values of $n = \log_2 t$ of the second signal into values of t.

* * * * *